(12) United States Patent
Van Vlimmeren et al.

(10) Patent No.: US 6,517,749 B1
(45) Date of Patent: Feb. 11, 2003

(54) METHOD OF PRODUCING A DISC AND A DISC OBTAINED BY THE METHOD

(75) Inventors: Quirinus A. G. Van Vlimmeren, Veldhoven (NL); Gustav B. G. Andersson, Sollentuna (SE)

(73) Assignee: OTB Group B.V., Eindhoven (NL)

( * ) Notice: Subject to any disclaimer, the term of this patent is extended or adjusted under 35 U.S.C. 154(b) by 0 days.

(21) Appl. No.: 09/511,080

(22) Filed: Feb. 23, 2000

(30) Foreign Application Priority Data

Feb. 23, 1999 (EP) ............................................ 99200530

(51) Int. Cl.⁷ ............................................. B29D 11/00
(52) U.S. Cl. ........................ 264/1.33; 156/182; 264/2.1; 425/810
(58) Field of Search ................................. 264/1.1, 1.31, 264/2.1, 1.33, 106, 107; 425/810; 156/182

(56) References Cited

U.S. PATENT DOCUMENTS

| 4,450,553 A | 5/1984 | Holster et al. |
| 5,688,447 A | 11/1997 | Hong |
| 5,700,539 A | 12/1997 | Hong |
| 5,708,652 A | 1/1998 | Ohki et al. |
| 5,820,794 A | 10/1998 | Jung |

FOREIGN PATENT DOCUMENTS

| EP | 0 368 442 A2 | 5/1990 |
| WO | 87/02934 | 5/1987 |
| WO | 87/02935 | 5/1987 |
| WO | 97/35720 | 10/1997 |

*Primary Examiner*—Mathieu D. Vargot
(74) *Attorney, Agent, or Firm*—Pillsbury Winthrop LLP

(57) ABSTRACT

A method of producing a disc having at least one substrate and at least one information layer on the substrate, the method includes bringing the substrate in parallel relationship with a stamper having a negative of the information layer to be formed on the substrate. A gap is located between the substrate and the stamper. A lacquer is injected into the gap between the substrate and the stamper. At least the stamper is rotated, moving the substrate and the stamper towards each other, thereby reducing the gap. The layer of lacquer formed between the substrate and the stamper is cured, and the stamper is removed, leaving the layer of cured lacquer with the information layer formed therein on substrate. Before bringing the substrate in parallel relationship with the stamper, the substrate is provided with a first information layer and a semi-reflective layer located thereon, whereby the layer of lacquer is formed onto the semi-reflective layer.

19 Claims, 2 Drawing Sheets

METHOD OF PRODUCING A DISC AND A DISC OBTAINED BY THE METHOD

Priority is based on European application 99200530.6, the complete disclosure of which is incorporated herein by reference.

BACKGROUND OF THE INVENTION

1. Field of the Invention

The invention relates to a method of producing a disc having at least information layers. The invention also relates to a disc obtained by the method.

2. Description of the Related Art

Japanese patent application 1-161252, filed Feb. 7, 1991 shows a method for producing a disc having one single information layer formed in a layer of resin which is applied to the substrate. A recording layer is applied on the layer resin. Thus, a single information layer on the disc is obtained.

Since the resulting disc has only one information layer, the storage capacity of the disc is relatively poor.

SUMMARY OF THE INVENTION

It is an aspect of the invention to provide a method for producing a disc having at least one substrate with at least two information layers whereby due to the method of the invention, the information layers can be applied relatively easy on the substrate.

This aspect is achieved by the method in that before bringing substrate in parallel relationship with the stamper, the substrate is provided with a first information layer and a semi-reflective layer located thereon, whereby the layer of lacquer is formed onto the semi-reflective layer.

By forming the layer of lacquer with an information layer therein on an earlier applied first information layer which is coated with a semi-reflective layer, a relatively quick and reliable method is obtained to produce a disc with two information layers. Due to the semi-reflective layer, the second information layer can be seen through the substrate and the first information layer.

BRIEF DESCRIPTION OF THE DRAWINGS

The invention will further be explained with reference to the drawings.

Like parts are numbered alike in the figures.

DETAILED DESCRIPTION OF THE INVENTION

Figure 1:
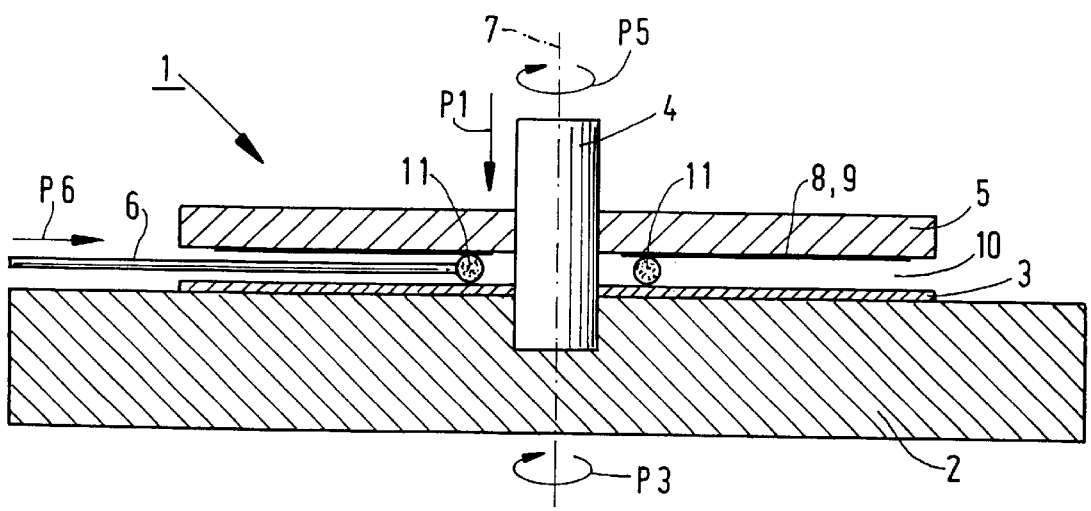
FIG. 1 is a cross sectional view of a device for performing the method according to the invention.
Figure 2:
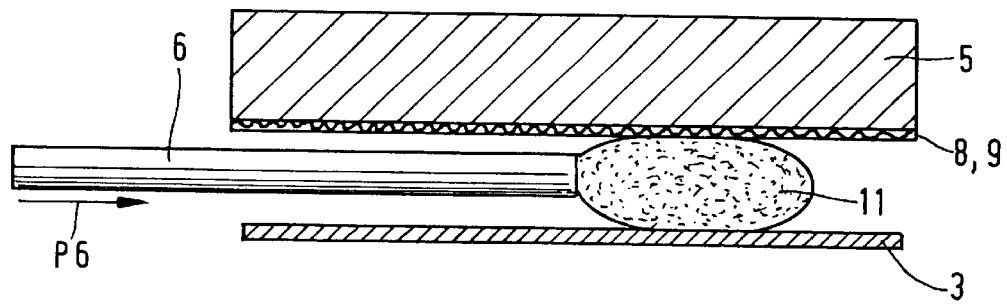
FIG. 2 is an enlarged view showing a detail of the device shown in FIG. 1.

FIG. 1 shows a cross sectional view of a device 1 for performing a method according to the invention. The device 1 comprises a table 2 which is rotatable in and opposite to a direction indicated by arrow P3 and a stamper 3 removably connected to the table 2 around a centering device 4. On a side directed away from the table 2 the stamper 3 is provided with a negative of an information layer to be applied. The device 1 also includes a substrate clamping device (not shown) to move the substrate 5 in and opposite to a direction indicated by arrow P1 and to rotate the substrate 5 in and opposite to a direction indicated by arrow P5 around the centering device 4.

Device 1 also includes a lacquer injecting needle 6 which is movable in and opposite to a direction indicated by arrow P6, which extends perpendicular to a centerline 7 of the centering device 4.

The substrate 5 is provided with a first information layer 8, having pits and lands and a semi-reflective layer 9 of for example gold or silicon, covering said first information layer 8. The substrate 5 has a thickness of about 0.6 mm.

The method of the invention to apply a second information layer to the substrate 5 will now be explained.

By means of the clamping device the substrate 5 is moved in direction P1 into parallel relationship with the stamper 3 until a desired gap 10 of about 1 to 2 mm, for example, is obtained between the substrate 5 and the stamper 3. The semi-reflective layer 9 on the substrate 5 is directed to the stamper 3.

The substrate 5 and the stamper 3 are now being rotated in the directions P5 and P3 with the same, relatively low speed of a few revolutions per second.

The needle 6 is inserted in the gap 10 and moved in the direction P6 to inject a lacquer 11 at about 20 to 40 mm, for example, of the centering device 4 between the substrate 5 and the stamper 3. While injecting the lacquer, the lacquer contacts the substrate 5 and stamper 3 at the same time so that no bubbles occur. Due to the rotation of the substrate 5 and the stamper 3, a ring-shaped bead of lacquer 11 is created.

After the desired amount of lacquer 11 has been applied, the needle 6 is removed.

Then, the substrate 5 is displaced into the direction P1 to reduce the gap 10 to a desired distance of about 0.2 to 0.3 mm, for example. The substrate 5 and stamper 3 are now being rotated at different speeds, at for example 2 revolutions per second and 5–6 revolutions per second respectively, due to which the lacquer 11 is smeared out. It is also possible to rotate the substrate 5 and the stamper 3 with the same speed but in different directions.

After a predetermined amount of revolutions or time, the clamping device is removed, leaving the substrate 5 on the layer of lacquer 11. Then the substrate 5 and stamper 3 are rotated together with a speed of about 3000 revolutions per second to spin out the lacquer throughout the whole gap 10. The gap 10 is thereby reduced to about 55 $\mu$m, for example. The lacquer 11, for example an ultraviolet curable resin, can now be cured, for example, by an UV-source, whereby UV-radiation may be irradiated through the substrate 5. After curing, the substrate 5 and the layer of lacquer 11 formed thereon are peeled off from the stamper 3. The outside of the layer of lacquer 11 now has the desired second information layer 12. On said second information layer 12 a reflective layer 13 of for example aluminum can be applied.

Figure 3:
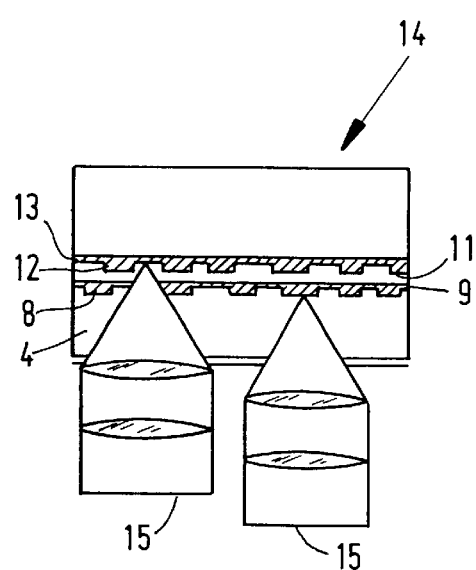
FIG. 3 is an illustrative view of a disc having two information layers produced with the method according to the invention.

FIG. 3 shows a disc 14 having two information layers 8, 12, applied according to the method of the present invention, as well as an additional substrate 4 to give the disc 14 a desired thickness. The substrate 5 may be glued for example to the reflective layer 13. FIG. 3 also shows two positions of heads 15 by means of which the information on the information layers 12 can be read.

Figure 4:
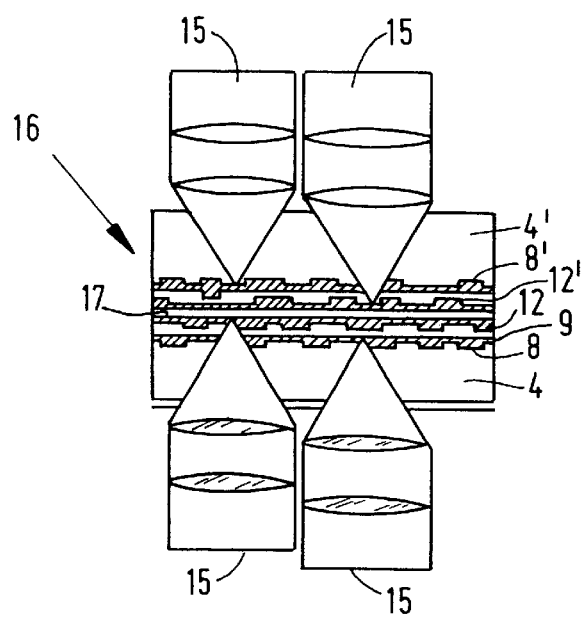
FIG. 4 is an enlarged view showing a disc having four information layers produced with the method according to the invention.
Figure 5:
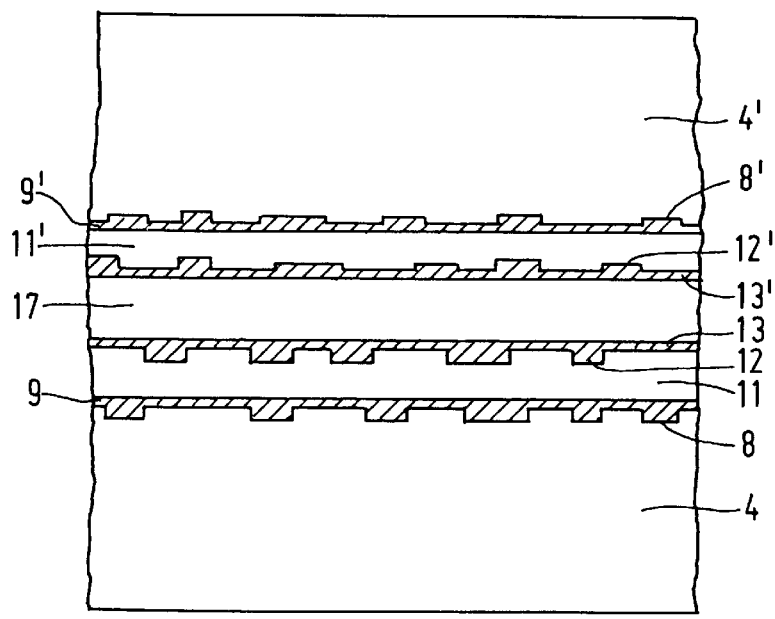
FIG. 5 is an enlarged view showing a detail of the disc shown in FIG. 4.

FIGS. 4 and 5 show a disc 16 having four information layers 8, 8', 12, 12'. The disc 16 comprises two substrates 4, 4' having two information layers 8, 12; 8', 12' formed by the method according to the present invention. The reflective layers 13, 13' of the substrates 4, 4' may be attached by an adhesive layer 17, for example. The adhesive layer 17 may be applied by the method described in WO 97/36737 for example, or another bonding method.

Stamper 3 is made of or provided with a layer of plastic or metal, which has a relatively poor adherence to the lacquer. With respect to the adherence between the semi-reflective layer 9 and the lacquer, the poor adherence ensures that the layer of lacquer will remain attached to the semi-reflective layer 9 when peeling off the stamper 3.

The plastic might be silicon rubber or teflon. The metal might be gold or chrome.

What is claimed is:

1. A method of producing a disc comprising at least one substrate and at least one information layer on said substrate, said method comprising:

bringing said substrate in parallel relationship with a stamper comprising a negative of the information layer to be formed on said substrate whereby a gap is located between said substrate and said stamper;

injecting a lacquer into said gap between said substrate and said stamper;

rotating said stamper and said substrate at the same speed;

moving said substrate and said stamper relative to each other and rotating said stamper and said substrate at the same speed to spin out said lacquer;

curing the layer of lacquer formed between said substrate and said stamper; and removing said stamper, whilst leaving said layer of cured lacquer with the information layer formed therein onto said substrate, wherein before said bringing of said substrate in parallel relationship with said stamper, providing said substrate with a first information layer and a semi-reflective layer located thereon, whereby said layer of lacquer is formed onto said semi-reflective layer.

2. A method according to claim 1, wherein a reflective layer is applied onto said information layer formed in said layer of lacquer.

3. A method according to claim 2, further comprising connecting together at least two of said substrates, whereby between the reflective layers of said substrates a bonding layer is applied.

4. A method according to claim 1, wherein at least the side of said stamper directed to said substrate is coated with a plastic or metal having a relatively poor adherence to said lacquer.

5. A method according to claim 1, wherein said stamper is made of plastic.

6. A method according to claim 1, wherein the injected lacquer contacts the substrate and stamper at about the same time.

7. A method of producing a disc comprising at least one substrate and at least one information layer on said substrate, said method comprising:

bringing said substrate in parallel relationship with a stamper comprising a negative of the information layer to be formed on said substrate whereby a gap is located between said substrate and said stamper;

injecting a lacquer into said gap between said substrate and said stamper;

rotating at least said stamper;

moving said substrate and said stamper relative to each other; wherein during and/or after said moving of said substrate and said stamper relative to each other, said substrate and said stamper are rotated with different, relatively low speeds to smear out said lacquer;

curing the layer of lacquer formed between said substrate and said stamper; and removing said stamper, whilst leaving said layer of cured lacquer with the information layer formed therein onto said substrate, wherein before said bringing of said substrate in parallel relationship with said stamper, providing said substrate with a first information layer and a semi-reflective layer located thereon, whereby said layer of lacquer is formed onto said semi-reflective layer.

8. A method according to claim 7, further comprising rotating said substrate, wherein said substrate and said stamper are rotated together at a relatively high speed to spin out said lacquer before said moving.

9. A method according to claim 7, wherein a reflective layer is applied onto said information layer formed in said layer of lacquer.

10. A method according to claim 9, further comprising connecting together at least two of said substrates, whereby between the reflective layers of said substrates a bonding layer is applied.

11. A method according to claim 7, wherein at least the side of said stamper directed to said substrate is coated with a plastic or metal having a relatively poor adherence to said lacquer.

12. A method according to claim 7, wherein said stamper is made of plastic.

13. A method according to claim 7, wherein the injected lacquer contacts the substrate and stamper at about the same time.

14. A method of producing a disc comprising at least one substrate and at least one information layer on said substrate, said method comprising:

bringing said substrate in parallel relationship with a stamper comprising a negative of the information layer to be formed on said substrate whereby a gap is located between said substrate and said stamper;

injecting a lacquer into said gap between said substrate and said stamper;

rotating at least said stamper;

moving said substrate and said stamper relative to each other;

rotating said substrate and said stamper together at a relatively high speed to spin out said lacquer;

curing the layer of lacquer formed between said substrate and said stamper; and removing said stamper, whilst leaving said layer of cured lacquer with the information layer formed therein onto said substrate, wherein before said bringing of said substrate in parallel relationship with said stamper, providing said substrate with a first information layer and a semi-reflective layer located thereon, whereby said layer of lacquer is formed onto said semi-reflective layer.

15. A method according to claim 14, wherein a reflective layer is applied onto said information layer formed in said layer of lacquer.

16. A method according to claim 15, further comprising connecting together at least two of said substrates, whereby between the reflective layers of said substrates a bonding layer is applied.

17. A method according to claim 14, wherein at least the side of said stamper directed to said substrate is coated with a plastic or metal having a relatively poor adherence to said lacquer.

18. A method according to claim 14, wherein said stamper is made of plastic.

19. A method according to claim 14, wherein the injected lacquer contacts the substrate and stamper at about the same time.

* * * * *